(12) United States Patent
Johansson et al.

(10) Patent No.: US 6,542,482 B1
(45) Date of Patent: Apr. 1, 2003

(54) LOAD SHARING FOR MCPA-EQUIPPED BASE STATION

(75) Inventors: Christer Johansson, Solna (SE); Magnus Frodigh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/166,159

(22) Filed: Oct. 5, 1998

(51) Int. Cl.[7] ................................. H04Q 7/00
(52) U.S. Cl. .................. 370/331; 370/337; 370/347; 370/442; 370/458; 370/498; 455/436; 455/522
(58) Field of Search ................. 370/318, 321, 370/331, 336, 337, 442, 458, 461, 498, 345, 347; 455/436, 450, 522

(56) References Cited

U.S. PATENT DOCUMENTS

| | | | |
|---|---|---|---|
| 4,670,899 A | | 6/1987 | Brody et al. .................. 379/60 |
| 5,164,958 A | * | 11/1992 | Omura ........................ 375/140 |
| 5,175,867 A | * | 12/1992 | Wejke et al. ............... 455/33.1 |
| 5,241,685 A | | 8/1993 | Bodin et al. ................ 455/33.2 |
| 5,367,559 A | * | 11/1994 | Kay et al. .................... 455/425 |
| 5,574,974 A | | 11/1996 | Almgren et al. ........... 455/33.1 |
| 5,625,868 A | | 4/1997 | Jan et al. .................... 455/13.4 |
| 5,732,076 A | * | 3/1998 | Ketseoglou et al. ........ 370/347 |
| 5,781,861 A | * | 7/1998 | Kang et al. ................. 455/442 |
| 5,805,995 A | * | 9/1998 | Jiang et al. ................. 455/436 |
| 5,896,570 A | * | 4/1999 | Saunders et al. ........... 455/437 |
| 5,956,641 A | * | 9/1999 | Bruckert et al. ............ 455/442 |
| 6,075,990 A | * | 6/2000 | Shin ........................... 455/440 |
| 6,160,999 A | * | 12/2000 | Chheda et al. ................ 455/69 |
| 6,216,004 B1 | * | 4/2001 | Tiedemann .................. 455/442 |
| 6,272,325 B1 | * | 8/2001 | Wiedeman ................... 455/117 |

FOREIGN PATENT DOCUMENTS

EP            0 805 568        11/1997

* cited by examiner

Primary Examiner—Alpus H. Hsu
Assistant Examiner—Roberta Stevens

(57) ABSTRACT

The present invention provides a method by which users may be moved between time slots or between base stations in order to better utilize the MCPA output power resources. According to an exemplary embodiment of the present invention, the power of all transceivers served by a certain MCPA is compared to a threshold value X. The value X is at least related to the capability of the MCPA in terms of output power. If at no times (i.e., at all time slots), the sum of the output power exceeds the threshold value X, it is assumed that the MCPA can handle all simultaneous transmissions. If, during at least one time slot it is found that the required output power exceeds the capability of the serving MCPA, then a reallocation or load sharing algorithm is invoked. The reallocation algorithm searches for time slots to which a reallocation could be performed within the same base station or number of transceivers served by the MCPA. If no time slots can handle users from the time slot in which the MCPA limit is exceeded, then a load sharing algorithm is activated and one starts to look for transmission resources in transceivers served by other MCPAs, e.g., other cells. A number of alternative embodiments of the invention is described, which relates to the way in which the reallocation or load sharing is performed. By reallocating or moving users of a particular kind, e.g., single slot users, and avoiding reallocation of users of other particular kinds, the load sharing and reallocation are further improved.

12 Claims, 4 Drawing Sheets

TIME SLOT

|   | 1 | 2 | 3 | 4 | 5 | 6 | 7 | 8 |
|---|---|---|---|---|---|---|---|---|
| 1 | 4 |   | 5 | 8 | 7 |   | 3 |   |
| 2 |   | 3 |   |   |   | 4 | 8 | 2 |
| 3 |   | 8 | 4 | 3 | 3 |   |   |   |
| 4 | 8 | 3 | 7 |   |   | 3 | 7 |   |
| 5 |   |   | 2 | 4 |   | 4 | 8 | 7 |
| 6 |   | 2 | 4 |   | 5 |   |   | 5 |
| 7 | 3 |   | 8 | 5 |   | 8 | 4 |   |

FREQUENCY

| 15 | 16 | 30 | 20 | 15 | 19 | 30 | 14 |

TOTAL OUTPUT POWER PER TIME SLOT

Fig. 2

LOAD SHARING FOR MCPA-EQUIPPED BASE STATION

BACKGROUND

The present invention relates generally to cellular systems that employ a time division multiple access (TDMA) channel strategy. More precisely, the present invention relates to a load sharing method for a base station equipped with a multi-carrier power amplifier (MCPA).

A base station architecture employing a multi-carrier power amplifier (MCPA) is illustrated in FIG. 1. In FIG. 1, the base station 100 includes N transceivers $110_1$–$110_N$ which send and receive signals on a predetermined frequency. The transceivers $110_1$–$110_N$ send signals to be transmitted to the multi-carrier power amplifier (MCPA) 120 where they are amplified and linearized.

Base station 100 also includes a sensor 150 which measures the power output from the antenna 140. Controller 130 controls the power output from MCPA 120 in response to the output power measured by the sensor 150. As will be appreciated by those skilled in the art, the base station 100 includes additional circuitry which aids in the sending, receiving and processing of data.

Designing MCPAs with a high output power is a difficult and expensive task. As the MCPA is designed to have a higher maximum output power, design costs become increasingly more expensive. For a base station operating using time division multiple access (TDMA), the maximum total output power of the base station limits the total output power of the frequency carriers at any time slot. TDMA, as one skilled in the art will appreciate, is a communication technique whereby different signals are assigned to different time slots on the same frequencies. One problem commonly associated with MCPAs designed for a particular output power and operating in a TDMA environment occurs when the desired total output power for any time slot exceeds the maximum allotted power for that time slot. In such an event, the MCPA loses linearity resulting in a decrease in link quality.

The following example illustrates the above-identified problem. Consider the time chart set forth in FIG. 2. In FIG. 2, seven frequencies (1–7) in use by an exemplary base station are illustrated over eight time slots. The numbers in the time chart indicate the required output power, in watts, for a mobile unit which is operating at a particular frequency and assigned to a particular time slot. For example, at frequency 1 and time slot 1, the mobile unit requires 4 watts (W). The total power for each time slot is depicted below the time chart. For time slot 1, for example, the total output power for frequencies 1–7 is 15 W. Assume, for this example, that the MCPA has been designed such that the total maximum output power for any time slot is 30 W. Now suppose that the user that is currently using frequency number 7 and time slot number 1 wants to increase its output power from 3 W to 8 W. This increase would increase the total power for time slot 1 to 20 W which would still be within allowable limits. If, however, the user at frequency 7 and time slot 7 wanted to increase its output power from 4 W to 8 W, the total power for time slot 7 would exceed the maximum allotted output power of 30 W. In such an event, the user requesting the higher power would likely not be granted the requested increase in output power thereby resulting in a decrease in the quality of the link associated with that user.

Several techniques have been developed in order to prevent systems, such as the MCPA described above, from exceeding the maximum capacity for which they have been dimensioned. Load sharing is one such technique. Conventional load sharing is basically a type of load balancing where a user is transferred from one cell which has reached its maximum capacity to another cell which can accommodate the user. This technique avoids overload situations. The following patents illustrate conventional load sharing techniques.

A method of balancing the load among cells which are operating at maximum capacity is described in U.S. Pat. No. 4,670,899, by Brody et al., and entitled "Load Balancing for Cellular Radio Telephone System". In Brody et al., the loading of various cells is dynamically redistributed by selectively transferring ongoing calls to adjacent cells in accordance with traffic levels in order to reserve channels for handoffs and for new calls. A channel occupancy level for a cell is periodically determined by comparing the number of channels utilized to the number of channels available within the cell. Calls are handed off before all the channels are utilized, thereby allowing at least one or more channels to be reserved for new or incoming calls.

According to the Brody et al. patent, if there is a mobile unit on the periphery of the cell which is also within the range of a neighboring cell, the mobile unit will be transferred to the neighboring cell in order to make room for a new call or an ongoing call associated with a mobile unit which will be handed off to the cell. While Brody et al. provides traffic-based control for call handoffs from one cell to an adjacent cell, handoffs due to load balancing are handled differently from handoffs due to mobile units leaving the cell. This creates a very complex system.

In U.S. Pat. No. 5,625,868 to Jan et al., and entitled "Dynamic Traffic Load Distribution Method", the control over a call is transferred from a first satellite to a second satellite having a partially overlapping coverage area with the first satellite when the power consumption level in the first satellite exceeds a certain predetermined level. This is accomplished by switching the channel off in the first satellite and on in the second satellite.

In commonly assigned U.S. Pat. No. 5,241,685 to Bodin et al., and entitled "Load Sharing Control for a Mobile Cellular Radio System", the entirety of which is incorporated by reference herein, a load sharing method is set forth which is based upon the occupancy of the channels defined by the ratio between the number of used occupied channels to the number of available channels.

The present invention distinguishes over the above-identified patents by providing a load sharing method which is invoked based on a power measurement of the base station's associated MCPA. The present invention recognizes that one may want to limit the maximum output power from an MCPA in order to reduce costs. The load sharing method of the present invention enables for a lower cost, lower power MCPA to be employed in a base station.

SUMMARY

The present invention seeks to overcome the problems of congestion and call blocking in a system employing under-dimensioned MCPAs by reallocating transmission resources in an intelligent manner such that the sum of the output power from a number of transceivers utilizing the same MCPA does not exceed the limit of the MCPA output power.

According to an exemplary embodiment of the present invention, the power of all transceivers served by a certain MCPA is compared to a threshold value X. The value X is at least related to the capability of the MCPA in terms of output power. If at no times (i.e., at all time slots), the sum of the output power exceeds the threshold value X, it is assumed that the MCPA can handle all simultaneous transmissions. If, during at least one time slot it is found that the required output power exceeds the capability of the serving MCPA, then a reallocation or load sharing algorithm is invoked. The reallocation algorithm searches for time slots to which a reallocation could be performed within the same base station or number of transceivers served by the MCPA. If no time slots can handle users from the time slot in which the MCPA limit is exceeded, then a load sharing algorithm is activated and one starts to look for transmission resources in transceivers served by other MCPAs, e.g., other cells. A number of alternative embodiments of the invention is described, which relates to the way in which the reallocation or load sharing is performed. By reallocating or moving users of a particular kind, e.g., single slot users, and avoiding reallocation of users of other particular kinds, the load sharing and reallocation are further improved.

BRIEF DESCRIPTION OF THE DRAWINGS

The above objects and features of the present invention will be more apparent from the following description of the preferred embodiments with reference to the accompanying drawings, wherein:

FIG. 2 illustrates an exemplary time chart which may be associated with a base station;

DETAILED DESCRIPTION

Figure 3:
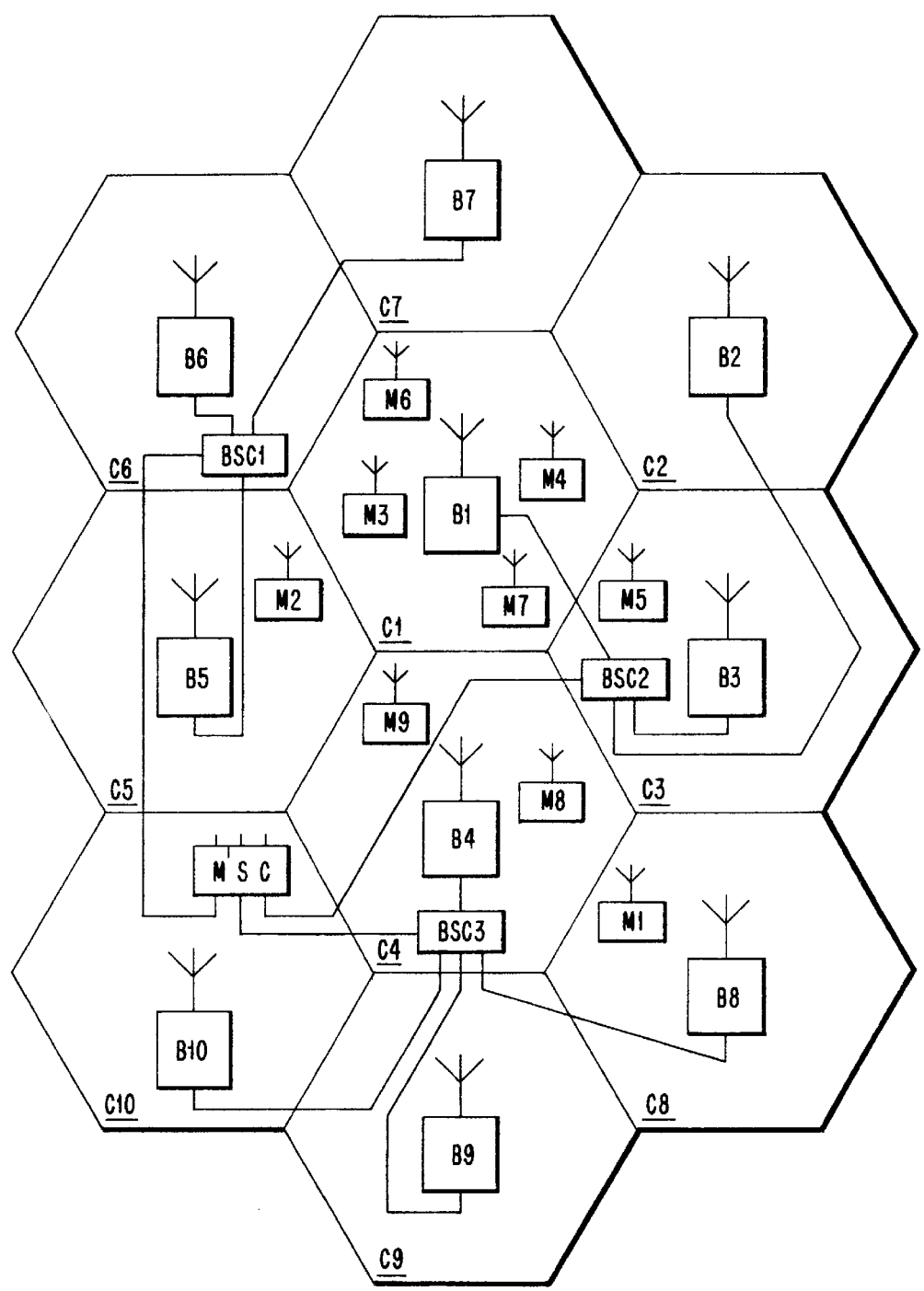
FIG. 3 illustrates an exemplary cellular mobile radio system.

FIG. 3 illustrates an exemplary cellular mobile radio system. In FIG. 3, the cellular mobile radio system is illustrated as comprising ten cells. One skilled in the art will appreciate that a typical cellular mobile radio system commonly includes more than ten cells; however, for the sake of brevity, the present invention is explained using the simplified representation illustrated in FIG. 3.

Each cell C1–C10 has a corresponding base station B1–B10. FIG. 3 illustrates the base stations as situated in the vicinity of the cell center and having omni-directional antennas. The cells C1–C10 are, therefore, schematically represented as hexagons. The base stations of adjacent cells may, however, be co-located in the vicinity of cell borders and have directional antennas as is well known to those skilled in the art. The base stations, according to exemplary embodiments of the present invention, are equipped with MCPAs and operate using time division multiple access (TDMA) techniques.

FIG. 3 also illustrates nine mobile stations M1–M9, moveable within a cell and among a plurality of cells. In a typical cellular radio system there would normally be more than nine cellular mobile stations. In fact, there are typically many times the number of mobile stations as there are base stations. However, for the purpose of explaining the invention, the reduced number of mobile stations is sufficient.

Also illustrated in FIG. 3 is an exemplary number of base station controllers BSC1–BSC3 and a mobile switching center MSC. The base station controllers BSC1–BSC3 control the operation of the base stations. The mobile switching center MSC is connected to each of the base station controllers BSC1–BSC3 and to a fixed public switching telephone network or similar fixed network (not shown). While only one mobile switching center is illustrated in FIG. 3, one skilled in the art will appreciate that additional mobile switching centers may be employed.

Figure 1:
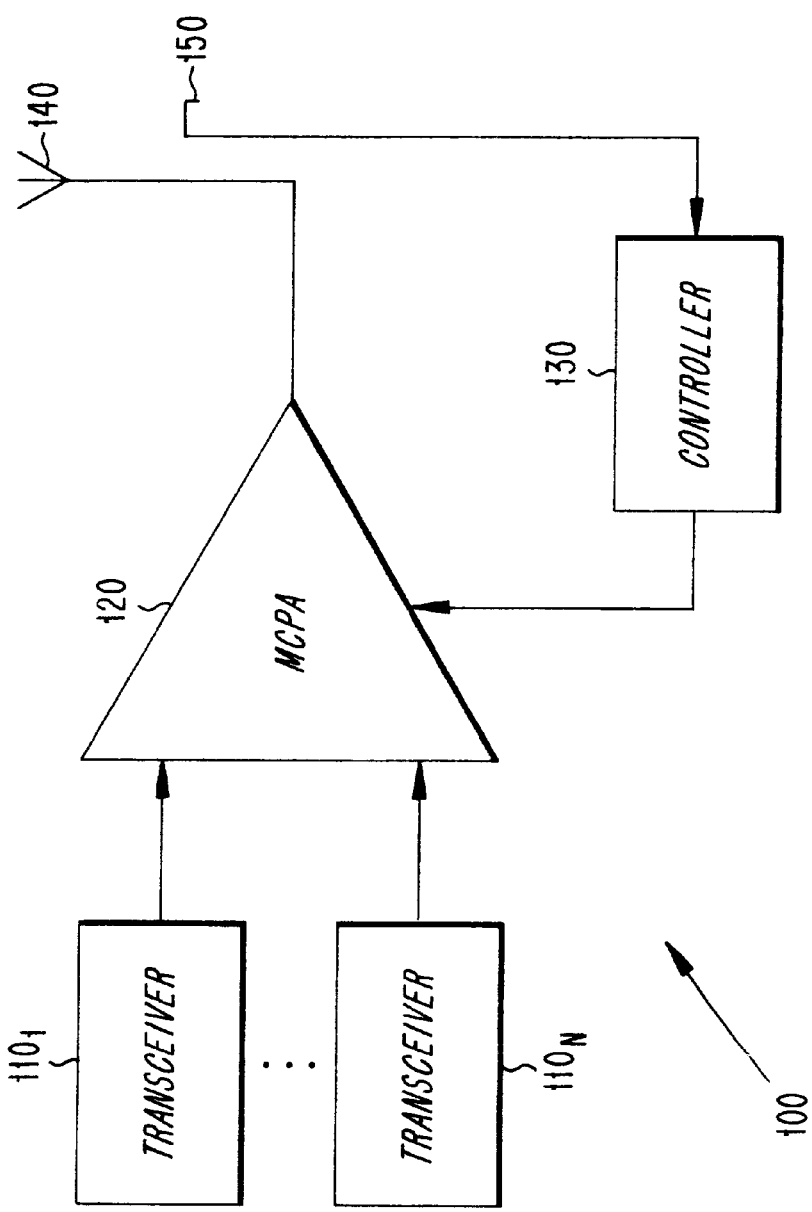
FIG. 1 illustrates a conventional base station employing a MCPA.

As mentioned above, the present invention is most applicable to a TDMA environment where the power of a system is limited. An exemplary base station in which the load sharing method of the present invention may be implemented was set forth above with respect to FIG. 1. Such a base station, operating in a TDMA environment, is commonly associated with a plurality of frequency carriers. Each frequency carrier is divided into a plurality of time slots to which mobile stations are assigned. Returning to FIG. 2, for example, the frequencies associated with an exemplary base station are depicted. Each of the seven frequencies is divided, for explanatory purposes, into eight time slots. Mobile users would be assigned to one or more time slots for transmission purposes.

When the MCPA has been dimensioned to a particular maximum output power, exceeding that maximum limit results in a loss in linearity and leads to a break of the specification (GSM, IS-136, etc.). As set forth in detail above, it is desirable to limit the maximum output power of the MCPA in order to, for example, reduce costs. The load sharing method of the present invention allows for a lower power, and, therefore, a lower cost MCPA to be employed by a base station.

Figure 4:
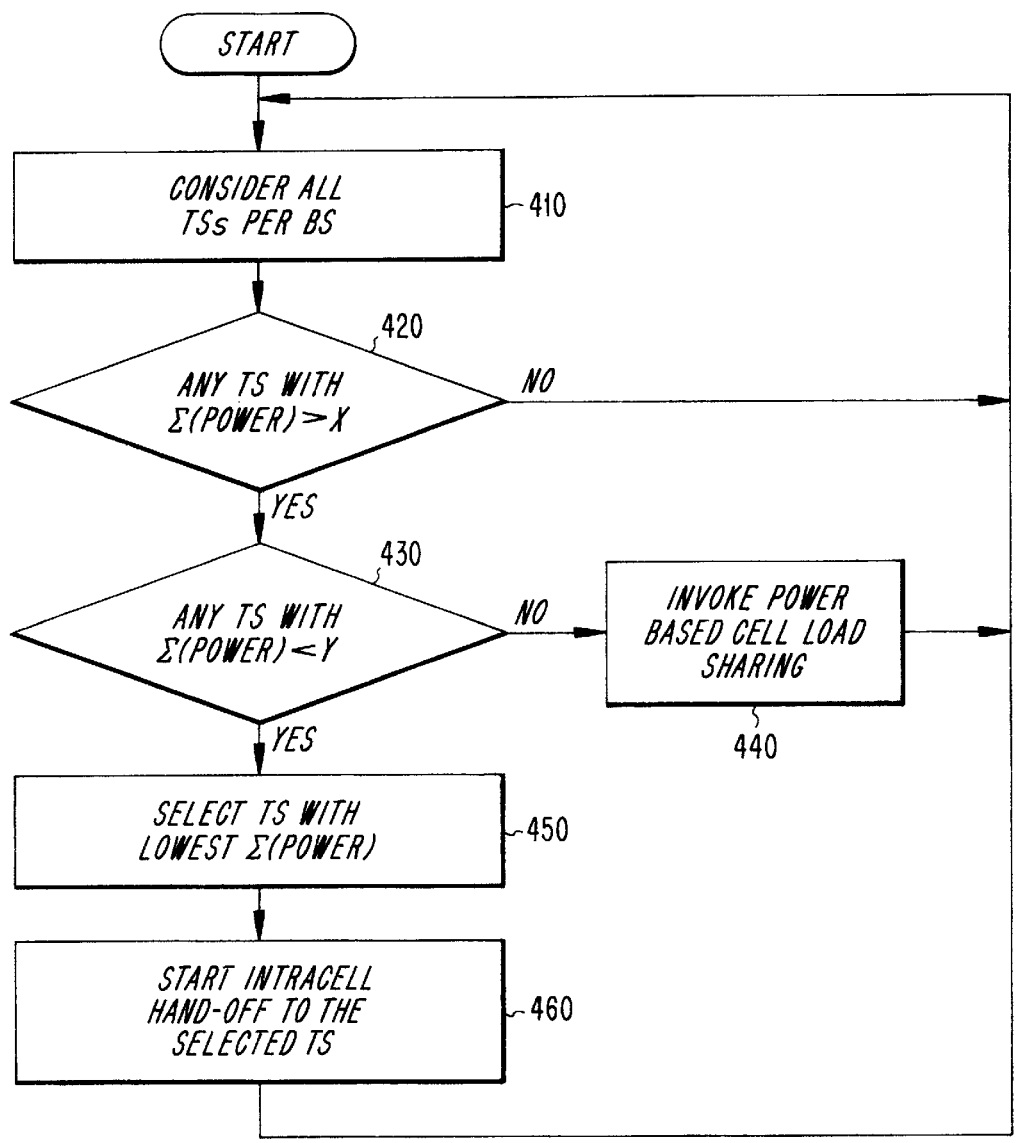
FIG. 4 illustrates the load sharing method according to exemplary embodiments of the present invention.

According to exemplary embodiments of the present invention, a reduced output power MCPA can be employed if users, whose power requirements for any particular time slot exceed the limit of the MCPA output power for that time slot, are moved between time slots and frequencies in the same cell (intra-cell handoff) or between cells (inter-cell handoff). FIG. 4 illustrates the load sharing method of the present invention.

In FIG. 4, the total power for each time slot for the base station is determined, for example, via measuring (step 410). The sum of the powers from all frequencies at each time slot (TS) is then compared to a threshold value X (step 420). The threshold value X can be set to the maximum allotted power for each time slot (i.e., the maximum power allowed by the MCPA for that time slot) or, in the alternative, to some value lower than that maximum allotted power.

In order to illustrate the comparison in step 420, consider the time chart in FIG. 2. As set forth above, the sum of the powers from all frequencies at each time slot is provided below the time chart. For example, for time slot 1, the sum of the powers equals 15 W and for time slot 3, the sum of the powers equals 30 W. If the exemplary MCPA has been dimensioned to allow for a maximum power of 30 W per time slot, then the threshold value X may be selected to be 30 W or some lower value. If the threshold value X is selected as 30 W, then for the total output powers depicted in FIG. 2, the comparison in step 420 would result in a "NO" answer for all time slots since the sum of the powers for each time slot does not exceed the threshold value of 30 W. If, however, the mobile user at frequency 3 and time slot 3 wants to increase its power from 4 W to 6 W, the threshold value would be exceeded for that time slot, resulting in a "YES" answer to the comparison in step 420.

If the comparison in step 420 indicates that there are no time slots having a total power greater than the threshold value X, then it is assumed that the MCPA can handle all simultaneous transmissions and the system returns to step 410. If, in the alternative, it is determined that one or more time slots exist that are above the threshold value X, then the total power of each of the remaining time slots (i.e., those time slots whose total output power does not exceed the threshold value X) is compared to a second threshold value Y (step 430). The threshold value Y is a "guard" so that a moved user will not cause problems to other users on that same time slot. One skilled in the art will appreciate that the threshold value Y could be a fixed value or a function of a variety of parameters, such as the requested increase in power, the absolute value of the requested power, the maximum allotted power, etc.

In order to illustrate the comparison in step 430, consider again the time chart illustrated in FIG. 2. Assume again that time slot 3 has exceeded the threshold value X (30 W), as set forth in the example above, when the user at frequency 3 and time slot 3 wants to increase its power from 4 W to 6 W. The total power of each of the remaining time slots (i.e., time slots 1, 2 and 4–8) is then compared to the threshold value Y. The threshold value Y should be at least equal to or less than the threshold value X (30 W) minus the desired output power (i.e., 6 W). Therefore, the total power of each of the remaining time slots is compared to a threshold value of 24 W. It is evident from the time chart in FIG. 2 that time slots 1, 2, 4–6 and 8 would satisfy this requirement thereby resulting in a "YES" answer to the comparison in step 430.

If no time slot can be found in step 430 having a total power less than the threshold value Y, then a modified version of the cell load sharing algorithm as described in U.S. Pat. No. 5,241,685 to Bodin et al., which is incorporated by reference herein, is invoked (step 440) and an inter-cell handoff is initiated. The difference between the present invention and the cell load sharing algorithm described in U.S. Pat. No. 5,241,685 is that the load sharing method of the present invention is triggered by an output power criterion as opposed to an occupancy level criterion. Prior to determining whether the occupancy of a particular cell exceeds a predetermined occupancy threshold value, the sum of the powers from all frequencies for each time slot associated with that cell are determined and compared to the threshold value Y. If it is determined that one or more time slots exist that are less than the threshold value Y, then the algorithm described in Bodin et al. continues. If all time slots in the cell under consideration equal or exceed the threshold value Y, then the next neighboring cell is considered.

If it is determined that multiple cells have time slots that are less than the threshold value Y, then the highest ranked cell is selected. The concept of "load sharing" is to change the threshold value for a handoff so that mobile stations on the periphery of a cell make an earlier handoff to another cell (i.e., the rankings of the other cells are increased compared to the own cell). This means that when the load sharing algorithm is invoked, due to either the number of mobile stations in a cell or the total power on a time slot, the own cell will "shrink" and the mobile stations on the periphery of the own cell will make an inter-cell handoff to the highest ranked cell.

One skilled in the art will appreciate that, in certain situations, it may be advantageous to move a user other than the one requesting the increase in output power. This may be due to, for example, the position of the other user within the cell, the number of time slots to which the other user has been allotted, the velocity of the other user, the amount of output power required by the other user, the signal strength, the signal quality and/or the type of service (i.e., speech or data). By moving this other user to another cell, enough power may be freed up on one time slot in the same cell so that an intra-cell handoff can be made, either with the user that requested the higher output power or some other mobile station on that specific time slot.

If one or more time slots with a lower total power than the threshold value Y are found, then the time slot with the lowest total power is selected (step 450) and the system makes an intra-cell handoff of one of the users on the high output power time slot to the time slot with the lowest total power (step 460).

As set forth above with respect to an inter-cell handoff, it may, in certain situations, be advantageous to move a user other than the one requesting the increase in output power. Some factors to be considered in determining which user to move in the intra-cell handoff include, but are not limited to, the number of time slots to which the user has been assigned, the power requirements for that user, signal strength, signal quality, type of service (i.e., speech or data), etc.

Moreover, it may be desirable to move multiple users around so as to free up enough power at a particular time slot for a user requesting an increase in output power. For example, in FIG. 2, assume that a new user requires an output power of 27 W. No time slot would be able to accommodate the new user without exceeding the maximum threshold value of 30 W. If, however, in time slot 1, the users at frequency 1 and frequency 4 were moved to either time slot 5 or 8, then the new user could be accommodated at time slot 1 and the users at time slot 1 could be accommodated at either time slot 5 or 8 without exceeding the threshold value of 30 W.

When it is determined that no intra-cell or inter-cell handoff can be performed in order to provide a user with a requested increase in output power, the output power of the base station remains constant on that time slot and the request for a higher output power is denied. One skilled in the art will appreciate, however, that such can endanger communications between the base station and the mobile station or at least decrease the performance of the link. One possible solution is to increase the output power for the requesting user up to the maximum allotted for that time slot even though the increase is not to the requested level. Alternatively, the user could be moved to a time slot which could provide the highest increase in output power for the user. Irrespective of whether the output power is increased to the maximum allotted value in the time slot in which the user is currently assigned or another time slot to which the user is moved, the load sharing method illustrated in FIG. 4 would be restarted in order to determine if an alternative time slot within the same cell or different cell has become available which is capable of supplying the requested output power.

According to another embodiment of the present invention, a third threshold value which is a function of the total power consumption in the MCPA is provided. Suppose that all time slots are within the power limit, so that the invention is not invoked, i.e., the total powers for all time slots are less than the threshold value X, but very close to X on every time slot. If a user wants to increase power, invoking an inter-cell handoff is the only solution if the total power would be greater than the threshold Y for all time slots. There would be some delay before some of the users have made the handoff to another cell and during this time, the links that want to increase the output power are denied the increase. If a third threshold value Z is introduced that is a percentage of the maximum power consumption on the MCPA, the above-described delay could be avoided. The absolute total power that is possible in the MCPA is known (i.e., the maximum power for which the MCPA is dimensioned or the sum of the maximum allotted power for each time slot is known) and if the total power in the MCPA (all time slots and all frequencies) are more than Z% of the maximum value, the cell load sharing algorithm is invoked and an inter-cell handoff is immediately commenced. As a result, the above-described delay is avoided.

While the above-described embodiments set forth that each cell in the radio communication system is associated with a single MCPA, one skilled in the art will appreciate that multiple MCPAs may be associated with a single cell. As a result, the intra-cell handoff technique is equally applicable to a single cell having multiple MCPAs wherein a user from a time slot associated with a first MCPA in a first cell is handed off to a time slot associated with a second MCPA in that same first cell.

The foregoing has described the principles, preferred embodiments and modes of operation of the present invention. However, the invention should not be construed as being limited to the particular embodiments discussed above. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for performing a handoff in a radio communication system, said method comprising the steps of:

determining per time slot a sum of output power of simultaneously transmitted signals from a first base station;

determining if at least one alternative time slot exists on said first base station which has a sum of output power below a second threshold;

performing, if at least one alternative time slot exists, an intra-cell handoff from a first time slot having a sum of output power which exceeds the first threshold to one of said at least one alternative time slot; and determining, when an intra-cell handoff is to be performed, which user to move to said one of said at least one alternative time slot based on one or more of a number of time slots to which a user is assigned, a power requirement of said user, signal strength, signal quality and type of service.

2. The method of claim 1 wherein said one of said at least one alternative time slot is selected based on a lowest total output power.

3. The method of claim 1 wherein said intra-cell handoff involves moving multiple users to different time slots.

4. The method of claim 1 wherein said second threshold is a function of an available output power per time slot and a desired output power of a user selected for handoff.

5. The method of claim 1 further comprising the steps of:

initiating, if at least one alternative time slot fails to exist, an inter-cell handoff process;

determining if at least one alternative time slot on a second base station exists which has a sum of output power below said second threshold; and performing, if at least one alternative time slot on a second base station exists, an inter-cell handoff of a user from one time slot on said first base station which has a sum exceeding said first threshold to one of said at least one alternative time slots on said second base station.

6. A method for performing a handoff in a radio communication system, said method comprising the steps of:

determining per time slot a sum of output power of simultaneously transmitted signals from a first base station;

determining if at least one alternative time slot exists on at least one other base station which has a sum of output power below a second threshold; and performing, if at least one alternative time slot exists on at least one other base station, an inter-cell handoff of a user from one time slot on said first base station which has a sum exceeding said first threshold to one of said at least one alternative time slots on one of said at least one other base station; and determining, when an inter-cell handoff is to be performed, which user to move to said one of said at least one alternative time slots on one of said at least one other base station based on one or more of position of the user within a cell covered by said first base station, velocity of said user, number of time slots to which the user has been assigned, amount of power required by the user, signal quality, signal strength, and type of service.

7. A system for performing a handoff in a radio communication system, said system comprising:

means for determining per time slot a sum of output power of simultaneously transmitted signals from a first base station;

means for determining if at least one alternative time slot exists on said first base station which has a sum of output power below a second threshold;

means for performing, if at least one alternative time slot exists, an intra-cell handoff from a first time slot having a sum of output power which exceeds the first threshold to one of said at least one alternative time slot; and means for determining, when an intra-cell handoff is to be performed, which user to move to said one of said at least one alternative time slot based on one or more of a number of time slots to which a user is assigned, a power requirement of said user, signal strength, signal quality and type of service.

8. The system of claim 7 wherein said one of said at least one alternative time slot is selected based on a lowest total output power.

9. The system of claim 7 wherein said intra-cell handoff involves moving multiple users to different time slots.

10. The system of claim 7 wherein said second threshold is a function of an available output power per time slot and a desired output power of a user selected for handoff.

11. The system of claim 7 further comprising:

means for initiating, if at least one alternative time slot fails to exist, an inter-cell handoff process;

means for determining if at least one alternative time slot on a second base station exists which has a sum of output power below said second threshold; and means for performing, if at least one alternative time slot on a second base station exists, an inter-cell handoff of a user from one time slot on said first base station which has a sum exceeding said first threshold to one of said at least one alternative time slots on said second base station.

12. A system for performing a handoff in a radio communication system, said system comprising:

means for determining per time slot a sum of output power of simultaneously transmitted signals from a first base station;

means for determining if at least one alternative time slot exists on at least one other base station which has a sum of output power below a second threshold;

means for performing, if at least one alternative time slot exists on at least one other base station, an inter-cell handoff of a user from one time slot on said first base station which has a sum exceeding said first threshold to one of said at least one alternative time slots on one of said at least one other base station; and means for determining, when an inter-cell handoff is to be performed, which user to move to said one of said at least one alternative time slots on one of said at least one other base station based on one or more of position of the user within a cell covered by said first base station, velocity of said user, number of time slots to which the user has been assigned, amount of power required by the user, signal quality, signal strength, and type of service.

* * * * *